March 30, 1943.                F. R. NORTON                2,315,073
                              ELECTRIC CIRCUIT
                            Filed May 1, 1941
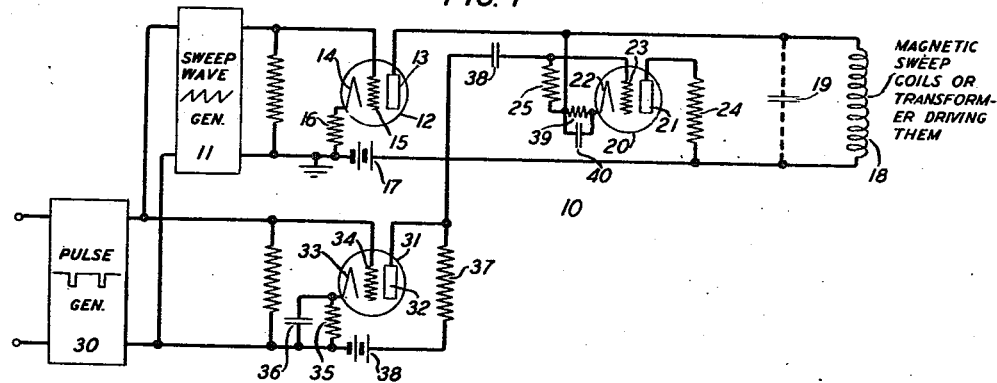
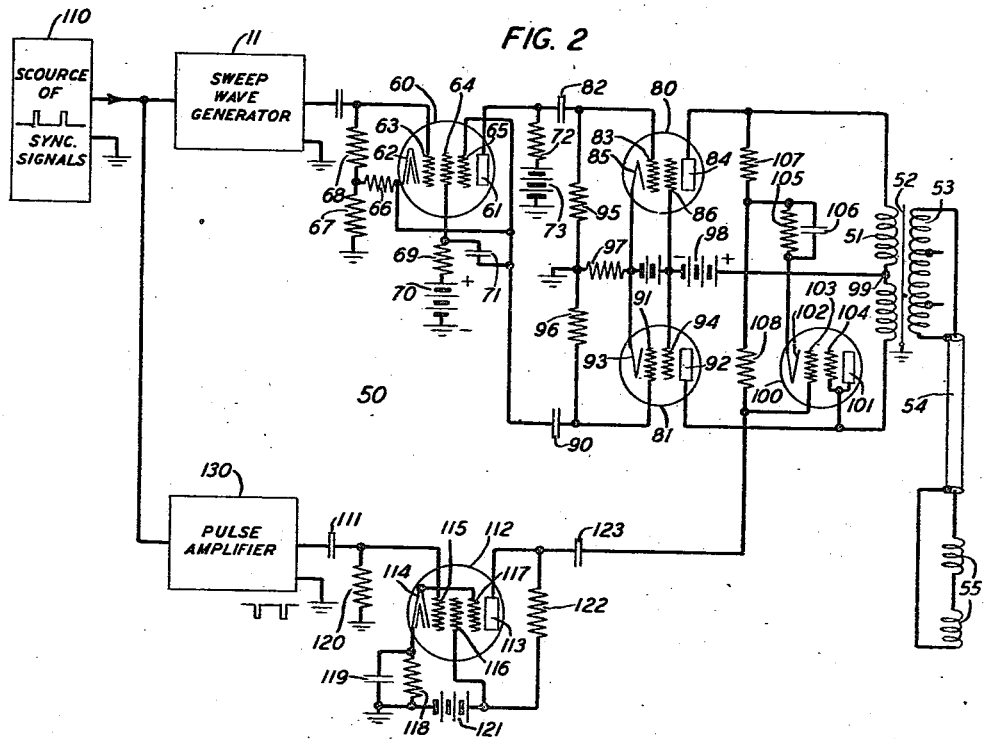
INVENTOR
F. R. NORTON
BY
       *C. C. Sprague*
           ATTORNEY Patented Mar. 30, 1943

2,315,073

UNITED STATES PATENT OFFICE 2,315,073

ELECTRIC CIRCUITS

Frank R. Norton, Chatham, N. J., assignor to Bell Telephone Laboratories, Incorporated, New York, N. Y., a corporation of New York Application May 1, 1941, Serial No. 391,377

3 Claims. (Cl. 250—27)

This invention relates to electric circuits and more specifically to sweep circuits for electromagnetic deflection of a cathode ray beam.

It is an object of this invention to provide novel oscillation circuits and particularly to provide improved electromagnetic sweep circuits.

Many conventional sweep circuits for electromagnetic deflection of a cathode ray beam use a short pulse to synchronize a sweep generator which is followed by a power amplifier for amplifying the sweep waves. The plate circuit of the power amplifier requires an element to damp out oscillations during the return sweep. These oscillations are due to resonance of the inductive load, either the magnetic sweep coils themselves or a transformer connected to them, with the stray capacities in the circuit, including the output capacity of the power tubes. In the past, a diode rectifier tube, a gas-filled tube, or a varistor have been used for this purpose. None of these damping means has been found satisfactory as they cannot be adequately controlled. Although a gas-filled tube can be grid-controlled under favorable circumstances, it is not suitable for use in cases where the frequency is considerably above 10 kilocycles as it is in modern television line frequency sweeps. This is because the ionization of the gas becomes continuous and the grid cannot regain control. Also the peak voltages encountered in magnetic line sweeps for high voltage cathode ray tubes are excessive for gas-filled tubes.

It is another object of this invention to provide novel damping means for use in electromagnetic sweep circuits.

In accordance with the invention, dynamic means is provided for damping an electromagnetic sweep circuit. This dynamic means comprises a grid-controlled high vacuum tube having its output circuit connected in circuit with the magnetic sweep coils of a deflecting arrangement for the beam in a cathode ray tube or across the primary winding of an output transformer, the secondary winding of which is connected in circuit with the deflecting coils.

In one embodiment, shown by way of example to illustrate the principles of the invention, the sweep circuit comprises means for forming a saw-tooth voltage wave, means for amplifying this wave and forcing a saw-tooth current wave through an inductance (the sweep coils or the transformer feeding the coils), a grid-controlled high vacuum tube connected across the inductance member which tube is non-conducting during most of the sweep cycle, and means for periodically applying pulses to the grid of the vacuum tube to make the tube conducting during the return portion of the sweep and thus to damp out any oscillations occurring when the current through the inductance member is reversed.

In one form of the invention the amplifier may be of the push-pull type, it being driven by a single tube the anode of which is connected to one of the push-pull tubes and the cathode of which is connected to the other of the push-pull tubes. The primary winding of the output transformer or the sweep coils are connected to the anodes of the push-pull tubes.

The invention will be more readily understood by referring to the following description taken in connection with the accompanying drawing forming a part thereof, in which:

Fig. 1 is a diagram of a sweep circuit embodying the invention; and

Fig. 2 is a diagram of a second sweep circuit embodying the invention.

Referring more particularly to the drawing, Fig. 1 shows by way of example a magnetic sweep circuit 10 employing dynamic damping. This circuit comprises a saw-tooth wave generator 11 of any suitable form, the output circuit of which is connected to the input circuit of a vacuum tube 12 (shown for simplicity as a triode comprising an anode 13, a cathode 14 and a grid 15, but which in practice would most likely be a pentode, such as a beam-power tube, because of its high internal impedance). A resistance 16 is connected between the cathode 14 and the grid 15 for biasing purposes. Connected between the anode 13 and the cathode 14 is a source of potential 17 and an inductance member 18. This inductance member 18 may comprise magnetic sweep coils for horizontal or vertical deflection of the cathode ray beam of a cathode ray tube (not shown) or it may comprise the primary winding of an output transformer, the secondary winding of which is connected in circuit with the sweep coils of a cathode ray tube. The self-capacity of the inductance member 18 plus the output capacity of tube 12 and the capacity of the wiring is represented by the stray capacity 19 (shown in dotted lines).

The current through the inductance member 18 tends to follow the saw-tooth voltage generated by the saw-tooth generator 11. However, during the return time, oscillations are set up between the inductance member 18 and the stray capacity 19 unless some means is taken to damp out these oscillations. It is known to use a diode rectifier or varistor or even a gas-filled tube as the damping member. These damping elements have not been satisfactory because they cannot be controlled as readily and precisely as desired, and produce undesired effects upon the sweep current wave form. In accordance with the present invention the damping is dynamic and the damping means comprises a high vacuum tube 20 having an anode 21, cathode 22 and a grid 23, the anode-cathode path of which is connected across inductance member 18 through a resistance 24, and a biasing resistor 39 is also connected between the cathode 22 and the sweep coils. A resistor 25 is connected between the grid 23 of the tube 20 and the cathode bias resistor 39.

The high vacuum tube 20 is preferably controlled by a pulse taken directly from the television signal in the receiver or it may be generated by the square-topped pulse generator 30 of any suitable form through an amplifier tube 31 having an anode 32, a cathode 33 and a grid 34. Bias for the grid 34 is supplied through resistance 35 and condenser 36. Also in the anode-cathode circuit of the tube 31 is an anode resistor 37 and a source of potential 38. The anode 32 is also connected to the grid 23 of the tube 20 through a coupling condenser 38. If desired the resistance-capacity coupling 37, 38 may be replaced by a transformer or any other suitable coupling means. Any suitable tube, such as a screen-grid or pentode tube, can be used in place of the tube 31, shown for simplicity as a triode.

The operation of the circuit of Fig. 1 is as follows:

The sweep wave of saw-tooth form is applied to the grid of the tube 12 from the sweep wave generator 11. This wave is synchronized by the pulse generator 30, or by pulses included in the incoming signal in the case of television receivers. The resistance 16 gives some local feedback and provides bias although this bias or a part of it may be obtained otherwise. If desired, another type of feedback circuit may be used or the resistance 16 may be by-passed by a suitable condenser. The tube 12 is a power amplifier for applying a sweep wave to the inductance member 18 which, as pointed out above, may be a transformer connected to the sweep coils of a cathode ray tube or which may be the coils themselves. The tube 20 is a power tube which provides a low impedance path across the inductance member 18 when needed for damping the oscillations set up in the coils during the sweep return. The tube 20 is made a high impedance with negligible shunting effect on the inductance member 18 during the forward part of the sweep wave. The control for the tube 20 is accomplished by the synchronizing pulses applied to the grid of the tube 31 from the square-topped-pulse generator 30. Thus a sharp negative pulse on the grid 34 of the tube 31 is arranged to be synchronized with the return of the sweep wave applied to the tube 12. If desired, the sweep wave generator 11 may be controlled by any suitable means and the pulse generator 30 controlled by a separate output from the sweep generator 11 to keep the pulses applied to tubes 31 and 20 in synchronism with the sweep wave itself. A sharp positive pulse is applied from the plate circuit of the tube 31 to the grid of the tube 20 thus making the tube 20 conducting and the plate impedance of this tube low during the return interval, as desired. The resistance 35 in the input and the output circuits of the tube 31 is preferably, although not necessarily, by-passed by the capacity 36. The resistance 24 in the plate circuit of the tube 20 is adjusted to secure the best damping condition and to limit the peak current in tube 20, but in some cases it may be preferable to omit it. The resistance 39 between the grid resistance 25 and the cathode 22 of the tube 20 is shunted by a capacity 40 in order to provide self-bias for the tube 20. Other biasing means may be used. By means of the circuit described above the tube 20 becomes substantially a short circuit for the inductance member during the return portion of the sweep and becomes a very high impedance shunt for the inductance member 18 during the slowly changing portion of the sweep cycle. With this arrangement all troublesome oscillations are prevented and the control is effective and certain.

A modification of the arrangement shown in Fig. 1 is shown in Fig. 2. In the circuit 50 shown in Fig. 2, the output circuit connected to the inductance member, shown in Fig. 2 as the primary winding 51 of the transformer 52 the secondary winding 53 of which is connected through a suitable transducer 54 to deflecting coils 55 of the cathode ray tube (not shown), is balanced. In the circuit of Fig. 2, the sweep wave generator 11 generates saw-tooth wave pulses which are amplified by the tube 60. The tube 60 preferably comprises a high vacuum tube having an anode 61, a cathode 62, a control grid 63, a screen grid 64, and a suppressor grid 65. Bias for the control grid 63 with respect to the cathode 62 is obtained by means of a resistance 66 which is connected through the resistance 67 to ground and through a resistance 68 to the grid 63. The resistance 68 is required to keep the input impedance high and to transmit the direct current bias to the grid. The screen grid 64 is preferably connected through a resistance 69 and a source of potential 70 to ground while the suppressor grid 65 is connected directly to the cathode 62. The condenser 71 is used to provide a by-pass between the screen grid and the cathode 62. The circuit between the anode 61 and the cathode 62 also includes an anode resistor 72 and a source of potential 73. By properly choosing resistors 72, 66, 67, 69 and 68, the tube 60 can be made to give equal outputs from its cathode and plate terminals, in opposite phase to each other. Also, these outputs can be made almost (but not quite) equal in magnitude to the input voltage between the grid 63 and ground.

The two output connections (from the anode 61 and the cathode 62) of the tube 60 are connected to two tubes 80 and 81 connected in push-pull, the anode 61 of the tube 60 being connected through a coupling condenser 82 to the grid 83 of the tube 80, while the cathode 62 of the tube 60 is connected through a coupling condenser 90 to the control grid 91 of the tube 81. The tube 80 as shown comprises anode 84, cathode 85, control grid 83, and screen grid 86 while the tube 81 preferably comprises anode 92, cathode 93, control grid 91, and screen grid 94. Resistors 95 and 96, the common terminal of which is connected to ground, are used to provide a direct current path for the grids of the tubes 80 and 81. Resistance 97 connected from ground to the cathodes 85 and 93 is used as a bias resistor for the tubes 80 and 81. Separate bias resistors to each cathode, either with or without by-pass condensers, may be used. The output circuits of the tubes 80 and 81 include a common source of potential 98 and a primary winding 51 of the transformer 52, a mid-tap 99 of the winding 51 being connected to the positive terminal of the source 98. If desired, triodes or pentodes may be used in place of the tetrodes 80 and 81. Beam-power tubes are very suitable for this purpose.

Also connected across the primary winding 51 of the transformer 52 is the discharge path of a high vacuum tube 100 having an anode 101, a cathode 102, a control grid 103, and a screen grid 104. The screen grid is connected to the anode thus effectively making the tube a triode although it is to be understood that a four or five-electrode circuit arrangement may be used if desired. The grid 103 receives bias through a resistance 105 and a capacity 106 shunted thereacross. A small resistance 107 may be connected to resistance 105 and capacity 106 to limit the peak current through the tube 100 although in some cases it may be preferable to omit resistance 107. A high resistance 108 is also included in the circuit between the grid 103 and the cathode 102 of the tube 100.

In order to provide synchronizing pulses, a source of synchronizing signals 110 is provided which is connected to the sweep wave generator 11 and also to the pulse amplifier 130, the output of which is connected through a coupling condenser 111 to an amplifier tube 112. The tube 112 preferably comprises an anode 113, a cathode 114, a control grid 115, a screen grid 116, and a suppressor grid 117. Bias for the grid 115 is provided by the resistance 118 and the capacity 119 shunted thereacross. The high resistance 120 is also included in the input circuit between the grid 115 and ground. The screen grid 116 is placed at a positive potential with respect to the cathode by means of the source 121. An anode resistor 122 is connected in circuit between the anode 113 and the cathode 114 along with the source 121 and the resistor 118 with its shunting capacity 119. The output of the amplifier tube 112 is connected through coupling condenser 123 to the control grid 103 of the tube 100. By means of the arrangement shown, the grid 103 of the tube 100 is made more positive during the return portion of the sweep so as to effectively provide a short-circuiting path for the transformer winding 51, thus dynamically damping out any oscillations which would occur between the transformer winding 51 and its shunted capacity (not shown in Fig. 2 but similar to the capacity 19 of Fig. 1).

The operation of the arrangement shown in Fig. 2 is similar to that shown in Fig. 1 except that the push-pull output tubes 80 and 81 are used to drive the inductance member 51 which may, as stated above, be the coils themselves rather than the output transformer. A feature of this embodiment of the invention is that the two output tubes 80 and 81 are driven by a single tube 60 and that a single tube is used to provide the dynamic damping of the inductance member 51 even though two tubes are used to drive it.

Various modifications may be made in the embodiments above described without changing the scope of this invention, which scope is indicated by the appended claims.

What is claimed is:

1. In combination, means for generating a succession of electrical pulses spaced in time by a period which is much longer than the period of one of said pulses, means for utilizing said pulses to control the generation of a sweep wave each cycle of which comprises a slowly changing portion and a quickly changing portion, a circuit including an inductance member, means including a push-pull amplifier having a balanced output circuit for applying said wave to said inductance member, and means for substantially reducing or preventing undesired oscillations through said inductance member due to distributed capacity in the circuit including said inductance member, said last-mentioned means comprising a single high vacuum electron discharge device having electron discharge control means and input and output circuits, means for connecting said inductance member and a current limiting resistance element in the output circuit of said device, means, including a resistance member which is included in both the input and the output circuits of said device and a condenser shunted across said resistance member, for biasing said control means to make said discharge device non-conducting during the time said slowly changing portion of said wave is applied to said inductance member, and means for impressing pulses from said pulse generator upon said control means to make said electron discharge device conducting during the quickly changing portion of each cycle of said sweep wave.

2. In combination, a source of relatively short pulses spaced in time by a period which is much longer than the period of one of said pulses, means for utilizing pulses from said source without reversing their polarity to control the generation of a sweep wave each cycle of which comprises a slowly changing portion and a quickly changing portion, a circuit including an inductance member, means for applying said sweep wave to said inductance member, and means for substantially reducing or preventing undesired oscillations through said inductance member due to distributed capacity in the circuit including said inductance member, said last-mentioned means comprising a high vacuum electron discharge device having electron discharge control means and input and output circuits, means for connecting said inductance member in the output circuit of said device, means for biasing said control means to cause said discharge device to be non-conducting during the time said slowly changing portion of said wave is applied thereto, means for reversing the phase of pulses from said source, and means for applying said phase-reversed pulses to said control means to make said electron discharge device conducting during the quickly changing portion of each cycle of said sweep wave.

3. In combination, a circuit including an inductance member, means for generating and applying to said inductance member electrical waves each cycle of which has a slowly changing portion and a rapidly changing portion and which waves tend to set up undesired oscillations through said inductance member due to the parasitic capacity in the circuit including said inductance member, said means comprising a push-pull power amplifier having the anodes thereof respectively connected to the terminals of said inductance member, high vacuum electron discharge means connected in circuit across said inductance member to damp said undesired oscillations, said discharge means having means by which its conductivity may be controlled, means for making said discharge means non-conducting during the slowly changing portion of each cycle, means for making said discharge means conducting during the rapidly changing portion of each cycle, and a resistance element in series with said inductance member in the output circuit of said discharge means to decrease the peak voltage applied to said discharge means during periods when it is conducting.

FRANK R. NORTON.